July 12, 1927.
J. F. GILL ET AL
1,635,319
ELECTRODYNAMIC POWER TRANSMITTING MECHANISM
Filed Jan. 25, 1923    6 Sheets-Sheet 2
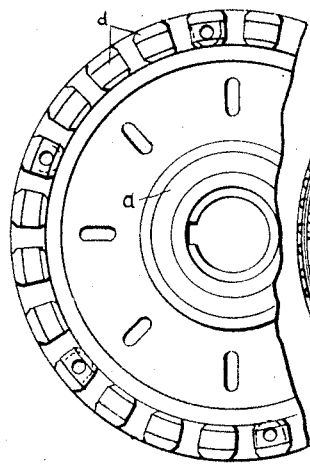
Fig.4.
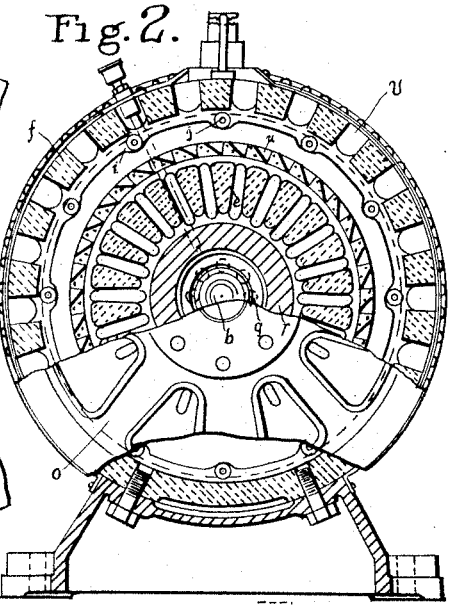
Fig.2.
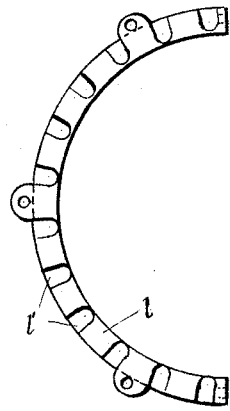
Fig.6.
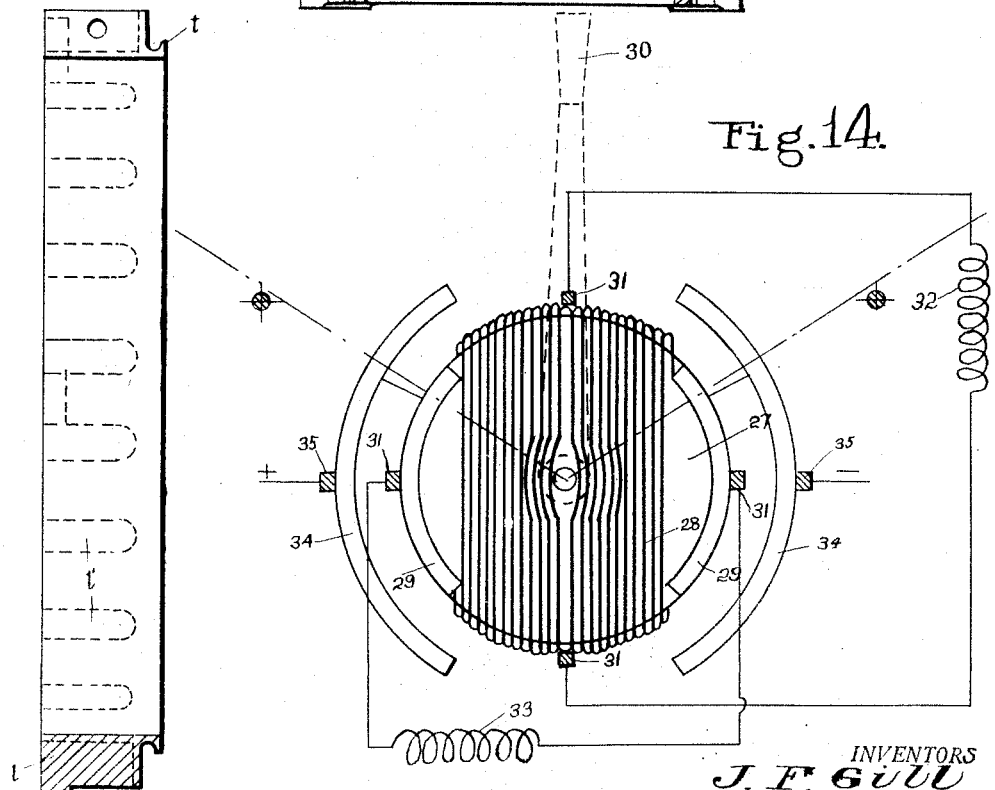
Fig.5.
Fig.14.
INVENTORS
J. F. Gill
BY J. N. Chaviara
Marks Clerk
ATTORNEYS.

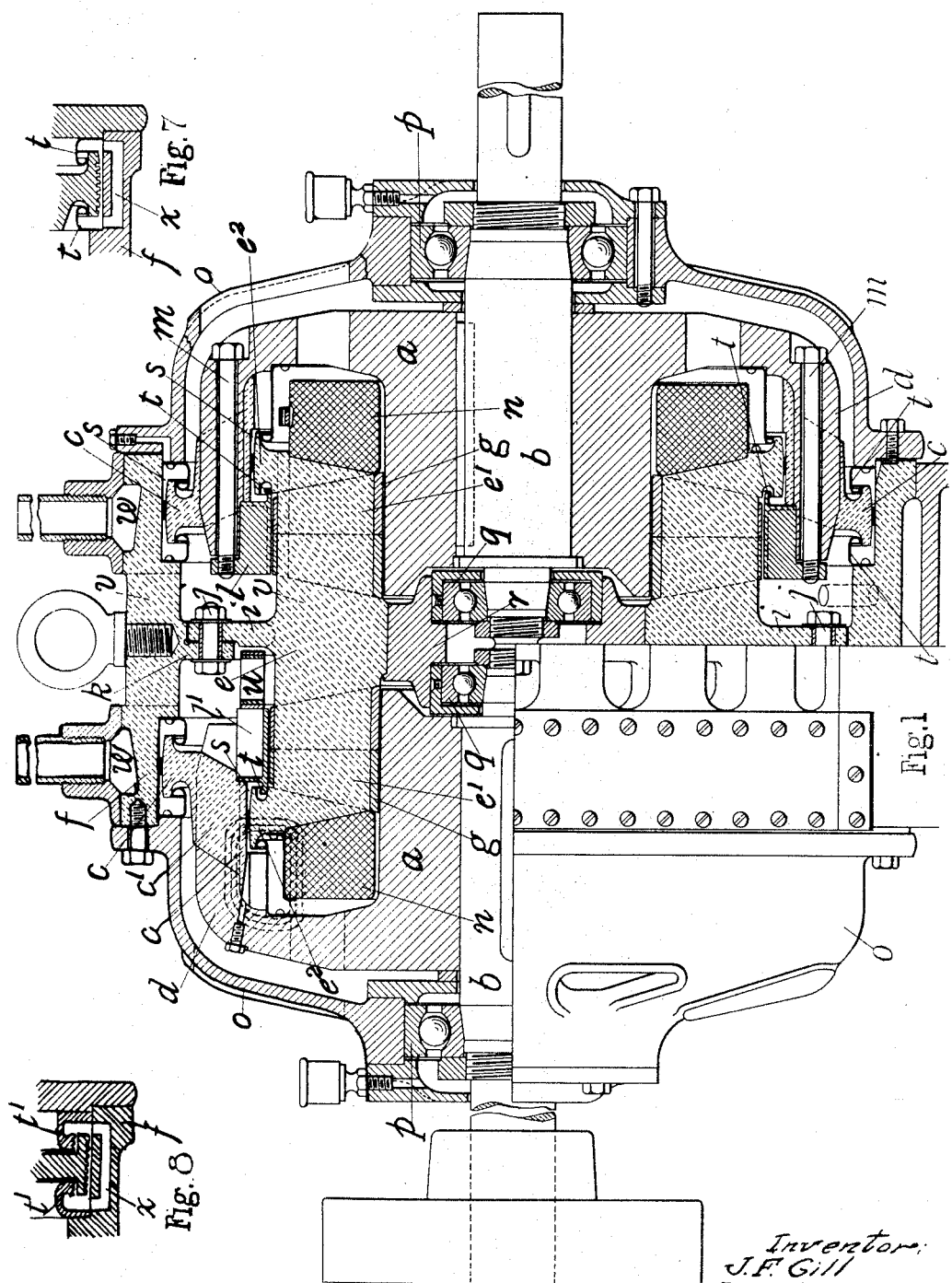

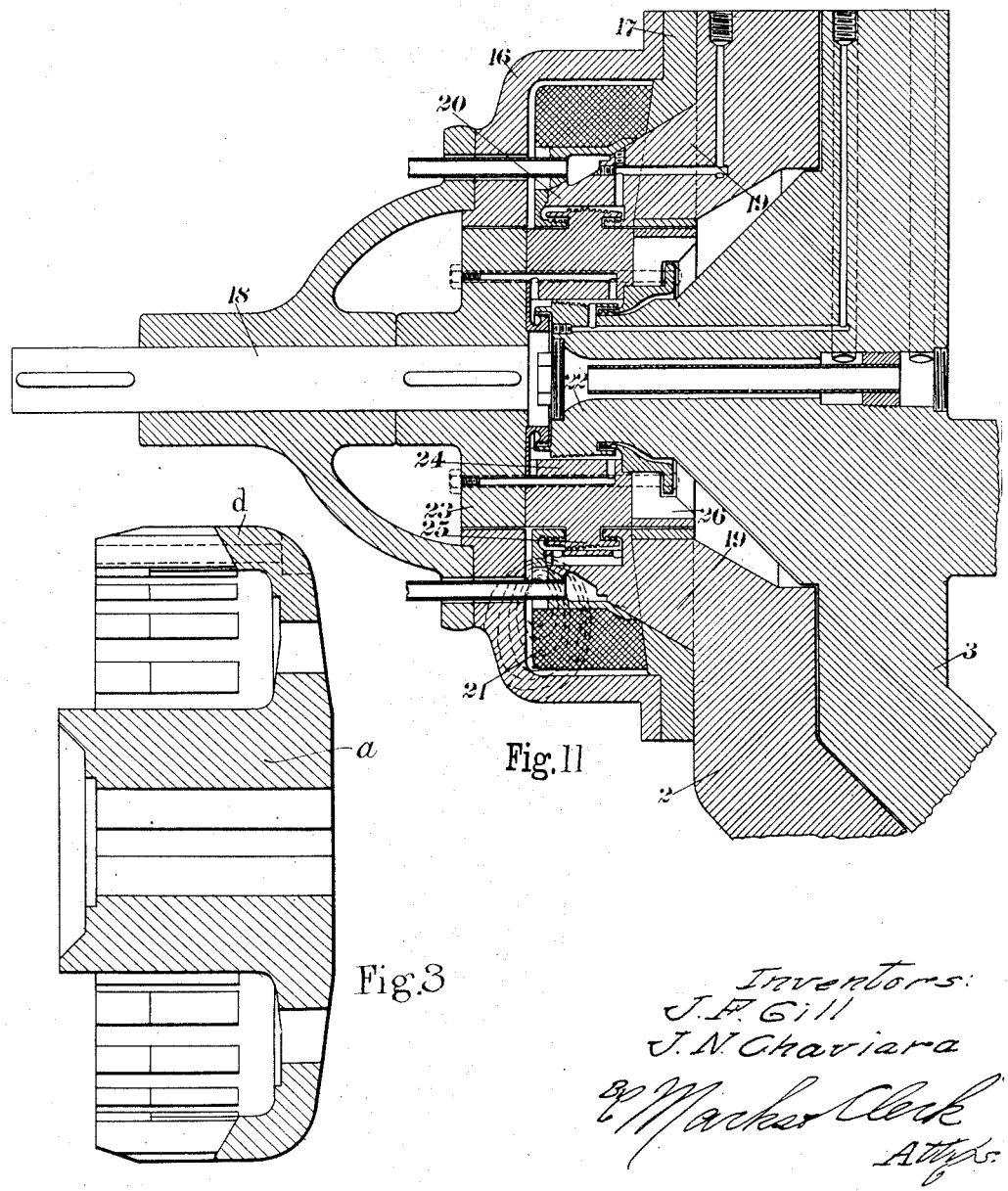

July 12, 1927.

J. F. GILL ET AL 1,635,319

ELECTRODYNAMIC POWER TRANSMITTING MECHANISM

Filed Jan. 25, 1923   6 Sheets-Sheet 4

Inventors
J. F. Gill
J. N. Chaviara
By Market Clerk
Atty's

Patented July 12, 1927.

1,635,319

UNITED STATES PATENT OFFICE.

JAMES FRANCIS GILL AND JOHN NICHOLAS CHAVIARA, OF LIVERPOOL, ENGLAND.

ELECTRODYNAMIC POWER-TRANSMITTING MECHANISM.

Application filed January 25, 1923, Serial No. 614,922, and in Great Britain February 11, 1922.

This invention has for its object to construct improved electro-dynamic power transmitting mechanisms applicable to a variety of purposes, such as the driving of ships, colliery winding gear, rolling mills, mechanically propelled vehicles, or any other mechanism in which variation of speed or torque or reversal of motion is required.

The invention comprises the employment in conjunction, of a homopolar generator and a homopolar motor, the magnetic systems of the two parts being interlinked by a metallic current path of low resistance.

Referring to the accompanying sheets of explanatory drawings:—

Figure 1 is a sectional side elevation of the mechanism.

Figure 2 is an end elevation partly in section of one form of the mechanism.

Figure 3 is a section taken diametrically through one of the rotor elements of the machine.

Figure 4 is a partial face view of said element.

Figure 5 is a section taken diametrically through a pole piece as used herein.

Figure 6 is a face view of one-half of this pole piece.

Figure 7 is a detail section showing one form of the means for retaining mercury as described herein.

Figure 8 is a further sectional view of a mercury retaining means.

Figure 11 is a sectional view through one end of the generator shown in Figures 9 and 10.

Figure 14 is a diagrammatic view illustrating the wiring of a regulator employed herein.

Figure 9:
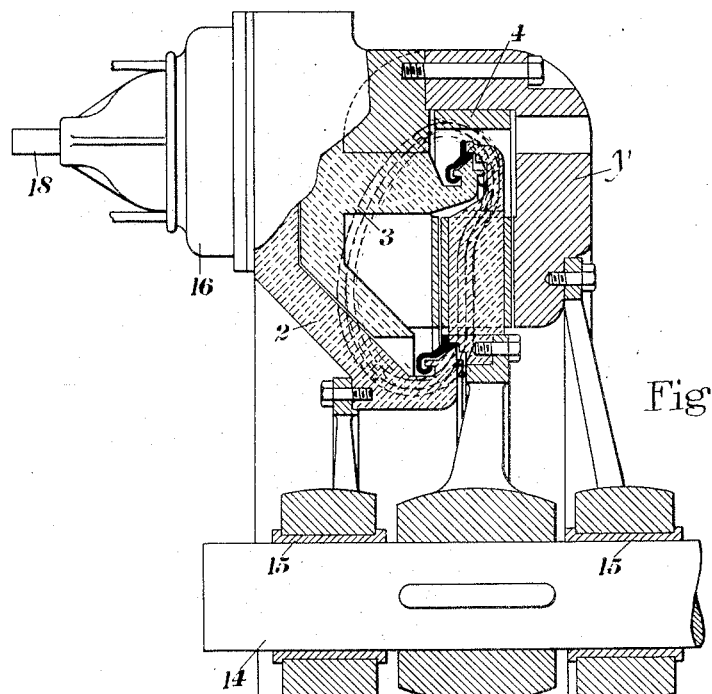
Figure 9 is a sectional view partly in elevation of a machine of this character designed for giving reduction of speed.

In the construction in accordance with this invention of a machine in which the dynamo and motor are of the same dimensions, as shown in Figures 1 and 2, two annular electro-magnets $a$ are employed, one for the generator and the other for the motor. Each is mounted on its own rotatable shaft $b$ and the two shafts are mounted in alignment. Each magnet is made from cast steel or other suitable material, and in form consists of a figure of revolution produced by rotating a figure of approximately C shape about a horizontal axis below the figure. The form of the steel portion of each magnet is shown in detail in Figures 3 and 4. The peripheral portion of the magnet is required to serve as a current conductor as well as a flux path, and is therefore preferably constructed partly from copper and partly from steel. A convenient construction consists of a ring of copper $c$ cast on to an annular system of transverse cores $d$ of steel, the latter being formed integrally with the peripheral portion of the magnet $a$. The inner and outer peripheries of the ring $c$ are continuous, and these are connected by the radial pieces $c'$ which occupy the spaces between the said steel cores $d$.

Two such magnets are placed face to face (see Figure 1) with their gaps adjacent, and they are interlinked by a current path of low resistance. This path is constructed from two stationary portions (an inner $e$ and an outer $f$) which are rigidly connected. The outer portion forms part of the case or frame of the machine and is made of copper or other suitable metal. The inner one is made mainly of copper, but has combined with it two rings $g$ of steel which respectively occupy the gaps in the two magnets $a$. Each of the steel rings $g$ is formed with an annular system of transverse holes $h$ into which copper cores $e'$ are cast, the latter at their ends being integral with continuous copper rings $e^2$—one located within each magnet—and the main intermediate portion $e$ connecting the steel rings. The intermediate portion is also formed with an outer central flange $i$ or a system of lugs for attachment by bolts $j$ to a corresponding inner member or members $k$ on the case. The lugs or flanges serve to effect a mechanical connection between the inner and outer parts of the current path, but electrically they are insulated from each other by mica strips and bushes, or in any convenient manner.

In conjunction with each magnet is arranged an annular pole piece $l$ (shown in detail by a sectional side elevation at Figure 5 and front elevation at Figure 6). Around its outer periphery each pole piece is formed with slots $l'$ which coincide with the gaps between the cores $d$ in the periphery of the main magnet portion. These slots serve to minimize the effect of armature reaction. The pole pieces are held in position by bolts $m$.

The exciting windings $n$ for the two magnets are stationary, and are carried within the magnets on the ends of the inner copper rings $e^2$ above mentioned forming part of the current path. Current is supplied to the windings from an external source and is controlled by any suitable rheostats.

The machine is completed by end plates $o$ or frames carrying the outer part of the current path and provided with end bearings $p$ for the magnet shafts. The inner adjacent ends of the shafts may be supported by bearings $q$ provided in conjunction with a central element $r$ fixed in the aforesaid inner portion $e$ of the current path.

It will be apparent from the foregoing that the current path is interrupted by spaces $s$ between the inner and outer portions of the current path and the copper ring in each of the magnets. These spaces are made as narrow as possible, and are filled with mercury, or a liquid amalgam of mercury and other metal or metals, and to obtain the best metallic continuity the adjacent copper faces are previously amalgamated. Initially the mercury may lie at the bottom of the spaces, but when the machine is set in motion the mercury will be automatically distributed throughout the spaces, and a perfectly continuous current path of very low resistance is obtained. Retention of the mercury to the parts adjacent to the gaps $s$ is effected by rings $t$ one of which is conveniently formed integrally with the pole piece $l$.

In action, the magnetic flux produced in each magnet by the current in the exciting coil passes around the main portion of the magnet, along the steel portions in the copper ring which is combined with the magnet, and through the stationary steel ring which occupies the gap of the magnet. When the generator magnet is rotating the current induced in the current path flows along the inner stationary copper portion, through the copper portions of the stationary steel rings in the magnet gaps, the inner mercury film, the intermediate copper ring of the magnet, the outer mercury film, the outer portion of the case, and back through the corresponding parts associated with the other magnet. With the motor magnet excited, current developed by the generator is utilized in producing rotation of the motor magnet. Any required speed, torque, or direction of motion can be obtained by suitably varying the excitation of one or both of the magnets.

In carrying the invention into effect, a variety of subsidiary mechanical details can be embodied in the machine. Thus an internal fan $u$ can be combined with one or each magnet, and radial air ducts $v$ for cooling can be provided in the inner and outer portions of the current path. Also the fixed portions of the machine can be formed with water-jackets $w$ for dissipating heat developed by the current.

To minimize lateral displacement of the mercury in the spaces $s$ when the machine is in action the adjacent copper faces are preferably serrated or grooved as shown in Figures 7 and 8, and to insure a proper distribution of mercury in the spaces suitably disposed equalizing or return-flow channels $x$ (Figure 7) are provided, so that mercury accumulating at one side of the space is automatically returned to the other side. Where the rings $t$ are insufficient to prevent escape of mercury an alternative construction as shown in Figure 8 may be employed. In this construction the rings $t'$ are thickened and their peripheral edges are grooved. The grooving may be arranged in the adjacent part of the rotor, or on both the rotor and the rings.

The above described machine embodies in its simplest form the essential features of a machine constructed in accordance with our invention, but the invention is not limited to the example given. The form and constructional details will vary with the purpose for which the machine is intended.

It is sometimes required that the motor shall always rotate at a much lower speed than the generator. In this case the two parts of the machine are made of appropriately different sizes, and the form of the current path joining the two machines is suitably shaped to admit of a small generator magnet being arranged at one end of the machine and a large motor magnet at the other end.

Figure 10:
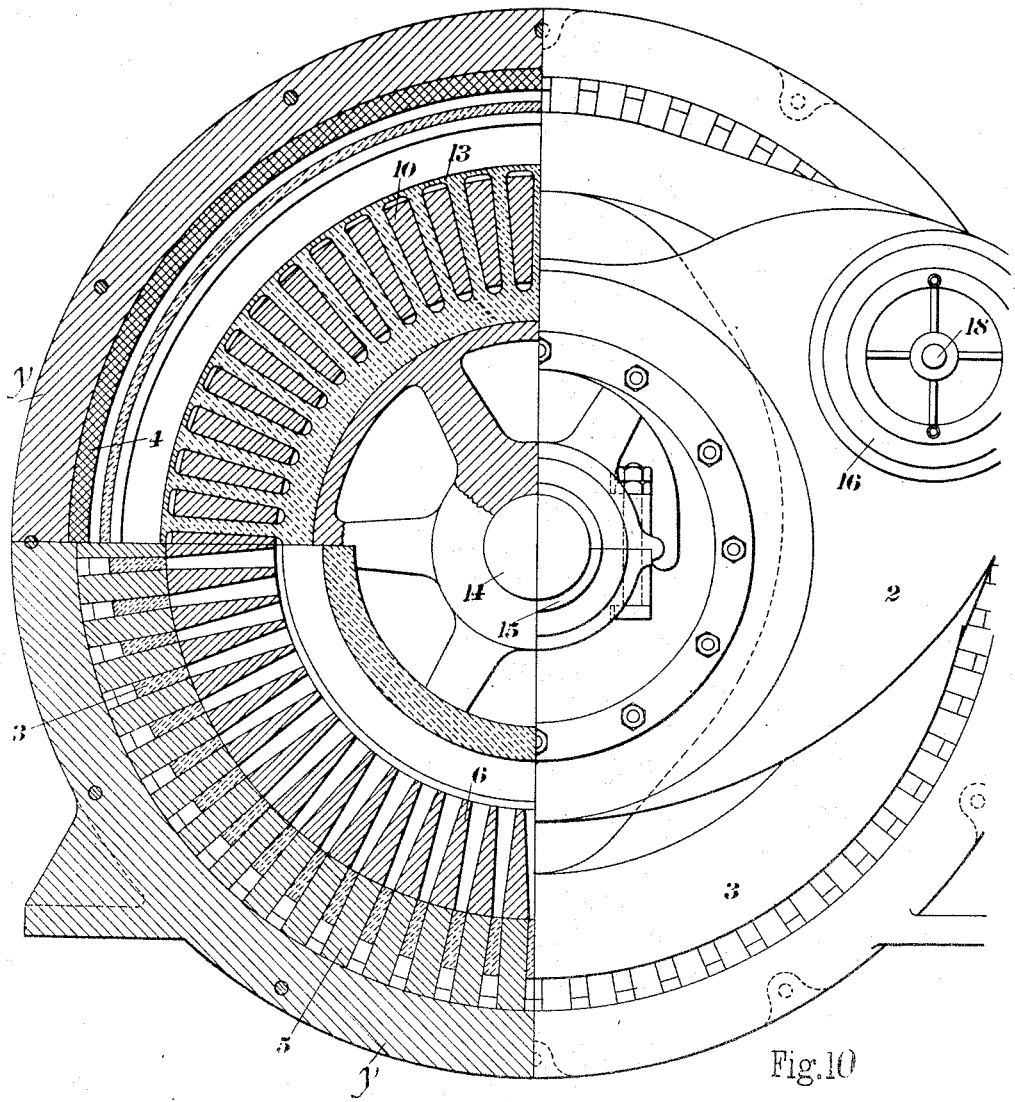
Figure 10 is a side elevation partly in section of this form of machine.

A machine designed for giving reduction of speed is shown in Figures 9 and 10. Figure 9 is a sectional side elevation of the machine, and Figure 10 a sectional front elevation. The machine is essentially the same as that above described and differs mainly in constructional features. The motor consists of two main parts—a rotor, and a stator of relatively large diameter. The stator comprises a steel magnet $y$ and two separate current conductors 2, 3. The magnet, which is provided with an exciting winding 4, is constructed from separately formed parts as shown, one of which consists of a radially slotted steel ring 5 with which is incorporated the copper conductor 3, whilst the other consists of a radially slotted ring 6 having a solid face which forms one side of the gap in which the rotor rotates. It will be understood that portions of the conductor 3 pass through the slots in the part 5. The said portions terminate in a continuous ring 7 which co-operates with the outer periphery of the rotor. The other conductor 2 is formed with a ring 8 which co-operates with the inner periphery of the rotor.

Figure 13:
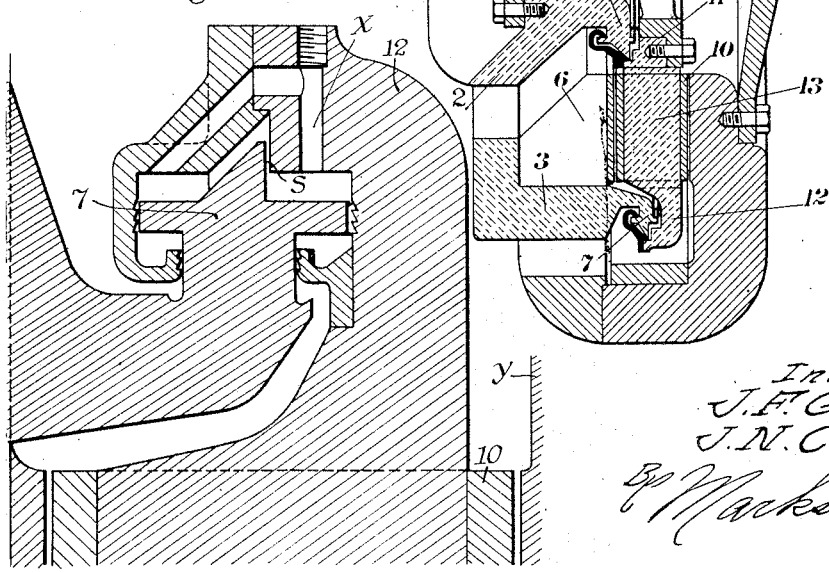
Figure 13 shows a greatly enlarged view of a modified form of mercury retaining device used herewith.

The rotor consists of a copper ring cast on to a radially slotted steel ring 10, the inner and outer peripheries 11, 12 of the copper portions being joined by parts 13 which pass through the slots in the steel ring. The construction of the adjacent portions of the stator and the outer periphery of the rotor is shown in detail at Figure 13. The interacting portions at the inner periphery of the rotor are similarly constructed.

The rotor is carried on a shaft 14 which is carried by bearings 15 on the stator. The mercury arrangements are similar to those above described.

Figure 12:
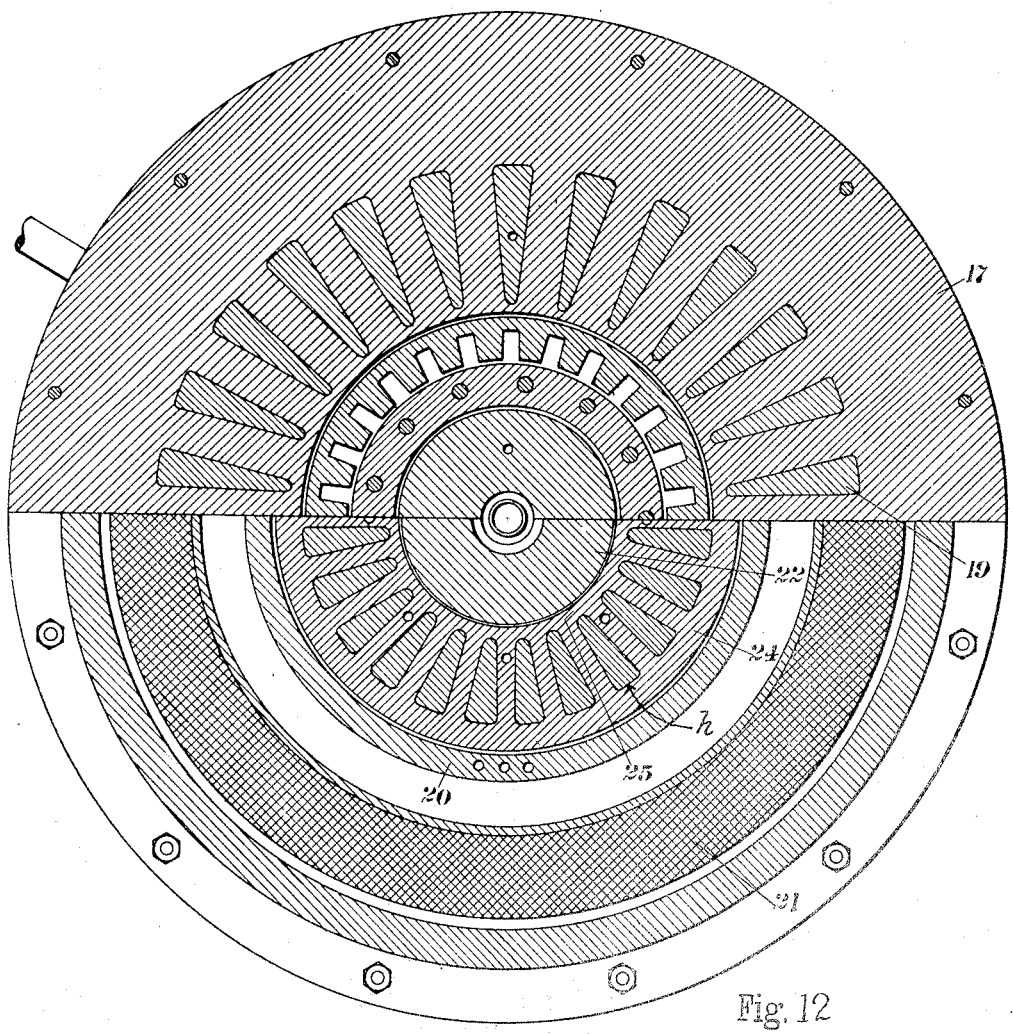
Figure 12 is a transverse section through said generator partly on one plane and partly on another.

The generator construction is shown in detail by the sectional side and sectional front elevations at Figures 11 and 12. In this case also the magnet is stationary and consists of a pair of steel parts 16, 17, the former of which is fitted with an end cover which carries the shaft 18. The part 17 is slotted and has arranged with it the conductor 2. The parts 19 of the conductor which pass through the slots in the part 17 terminate in a continuous ring 20. The magnet is excited by a winding 21. The conductor 3 is shaped to form the central portion of the generator and has formed in it a circular portion 22. The rotary part of the generator consists of a steel portion 23 formed with radial slots on which is arranged a copper part which passes through the slots and terminates in continuous inner and outer rings 24, 25. The one end of the part 23 terminates in a slotted pole piece 26 similar to the corresponding pole pieces already described. Provision is made as shown for the mercury required between the relatively moving portions of the current path, and for cooling the various elements of the machine. With the magnet excited, current is generated when the member operated by the shaft 18 is rotated, and this current is conveyed to the motor by the conductors 2, 3.

Although cast copper has been mentioned above, any other convenient form of copper such as rolled elctrolytic copper may be used, the form employed being that which is most convenient in the construction of the machine. Also it is usually advantageous to nickel plate or otherwise treat the surfaces with which the mercury makes contact. Further instead of copper, aluminum may be employed if desired, provided suitable precautions are taken to prevent the mercury from causing any deleterious effect. It will be understood that the term copper is herein used to include any other metal of suitable conductivity. In some constructions the portions which carry both flux and current may be made entirely of steel, instead of steel and copper as above described, as the disadvantage due to the higher electrical resistance of the steel may be counter-balanced by advantages, such as increase of flux.

In the machine shown in Figure 1 the spaces s in which the mercury is located the adjacent surfaces are parallel with the axis of rotation, and as above mentioned the mercury tends to move sideways along such spaces. To counteract this tendency the disposition of the surfaces shown in Figure 13 in which the space s is at right angles to the axis of rotation may be employed in all forms of machines constructed in accordance with this invention.

A convenient form of regulator for use with our machines is shown diagrammatically at Figure 14. The regulator comprises a circular drum 27 of slate, porcelain or the like, wound round with a close pitch coil 28 of resistance wire on a portion of the circumference subtending an angle of 90° at the centre. The wire is of graded section, i. e. thicker wire is used for the outer coils, and towards the centre successively smaller gauges are used. The two extreme ends of this resistance coil are connected to two copper quadrants 29 which also subtend an angle of 90° at the centre. The drum 27 is mounted on a spindle so as to be capable of rotation through a limited angle by means of a lever 30. Fixed to an outer casing and insulated therefrom are four contact brushes 31 spaced at 90°. One opposite pair is connected to the generator field winding 32 of our transmission mechanism while the other opposite pair is connected to the motor field winding 33. Electrically connected to the copper quadrants 29 and rigidly attached to the drum are two longer segments 34 of copper which subtend an angle at the centre just short of 180°. Pressing on these are two contact brushes 35 connected respectively to the positive and negative supply mains. With the operating handle in its central position, the current passes through all the resistance coils but because the resistance is high the current passing is very small. The potential difference between the generator field brushes is nil consequently the current through this field is zero. While at the same time the motor field is subject to the full potential difference. On moving the handle to the right the potential difference across the generator field is gradually built up until at 45° the copper quadrants connect the top and left hand and the bottom and right hand brushes respectively. At this position both fields are fully excited. Further movement of the handle, while maintaining the generator field at its maximum strength introduces resistance into the motor field and so causes a speeding up of the motor beyond the normal. Stops are provided to prevent over-weakening of the motor field and so limiting the motor speed to a safe figure.

When the handle is moved over to the left the same sequence of events takes place, but the current through the generator field is reversed.

Our invention is not limited to the particular constructional details heretofore described as these may be varied to suit different requirements. Also the invention is applicable to machines in which the axis of rotation is arranged vertically.

Having thus described our invention what we claim as new and desire to secure by Letters Patent is:—

1. In a dynamic-electric machine of the homopolar type, a rotor element carrying both flux and current, a stator element concentric to the rotor and carrying both flux and current, and a substantially frictionless conductor element in the gap between the rotor and stator and forming a current conductor therebetween, each of said elements comprising a magnetic and conductive body of substantially annular form and having an annular series of slots parallel to its axes, and conductive bars in said slots.

2. In a dynamic-electric machine of the homopolar type, a rotor element carrying both flux and current, a stator element concentric to the rotor and carrying both flux and current, mercury in the gap between the rotor and stator, each of said elements comprising a magnetic and conductive body of substantially annular form and having an annular series of slots parallel to its axes, and conductive bars in said slots.

3. In a dynamic-electric machine of the homopolar type, a rotor element carrying both flux and current, a stator element concentric to the rotor and carrying both flux and current, mercury in the gap between the rotor and stator, gaps between the rotor the stator being sufficiently narrow to retain the mercury by capillary action, each of said elements comprising a magnetic and conductive body of substantially annular form and having an annular series of slots parallel to its axes, and conductive bars in said slots.

In testimony whereof we have signed our names to this specification.

JAMES FRANCIS GILL.
JOHN NICHOLAS CHAVIARA.